April 13, 1926. 1,580,117
S. J. CLULEE
EYEGLASS CONSTRUCTION
Filed May 19, 1919
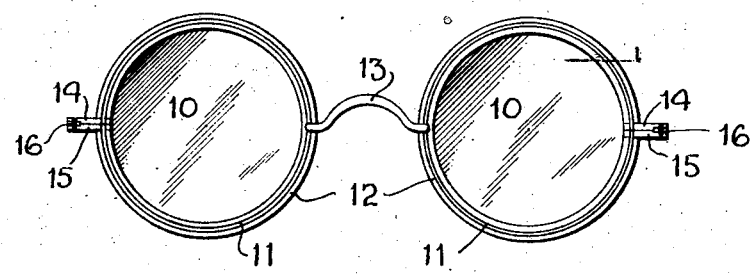
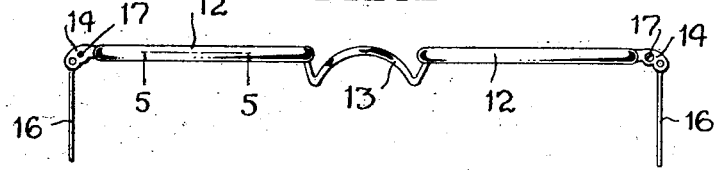
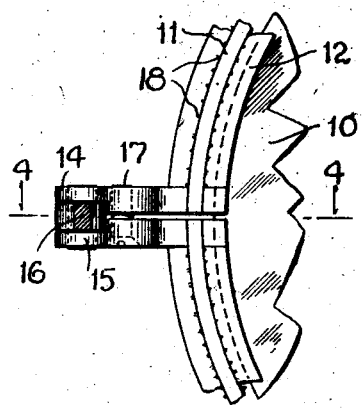
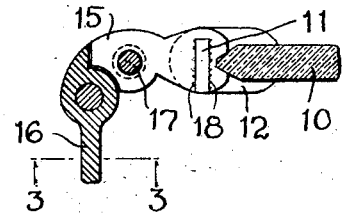
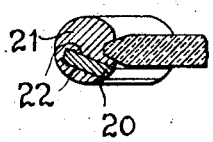
Inventor
Stephen J. Clulee
By his Attorneys Patented Apr. 13, 1926.

1,580,117

UNITED STATES PATENT OFFICE.

STEPHEN J. CLULEE, OF ATTLEBORO, MASSACHUSETTS, ASSIGNOR TO BAY STATE OPTICAL COMPANY, OF ATTLEBORO, MASSACHUSETTS, A CORPORATION OF MAINE.

EYEGLASS CONSTRUCTION.

Application filed May 19, 1919. Serial No. 298,222.

*To all whom it may concern:*

Be it known that I, STEPHEN J. CLULEE, a citizen of the United States, and a resident of Attleboro, in the county of Bristol and State of Massachusetts, have invented an Improvement in Eyeglass Construction, of which the following is a specification.

This invention relates to eyeglass construction and more particularly to the construction of eyeglasses, the rim of which comprises a non-metallic member. One of the objects thereof is to provide eyeglasses of simple and yet strong construction and adapted to withstand hard use. Another object is to provide eyeglasses of the above type of attractive appearance. Another object is to provide an art of forming eyeglasses of the above nature which can be quickly and cheaply carried on and which is characterized by reliable and uniform results. Other objects will be in part obvious and in part pointed out hereinafter.

The invention accordingly consists in the features of construction, combinations of elements, arrangement of parts and the several steps and relation of such steps, all as will be hereinafter illustratively described and the scope of the application of which will be indicated in the following claims.

In the accompanying drawings in which is shown one or more of various possible embodiments of the mechanical features of this invention, Figure 1 is a rear elevation of a pair of eyeglasses;

Figure 2 is a plan view thereof;

Figure 3 is a detail rear view of a portion of the glasses shown in Figure 1 along a section taken substantially on the line 3—3 of Figure 4;

Figure 4 is a sectional view along the line 4—4 of Figure 3;

Figure 5 is a longitudinal section along the line 5—5 of Figure 2, the parts being shown on an enlarged scale;

Figure 6 is a cross-section of a rim and associated parts, showing a slightly different construction.

Similar reference characters refer to similar parts throughout the several views of the drawings.

Referring now to Figure 1 of the drawings, there is shown a pair of lenses 10—10 respectively mounted in similar rims. Each of these rims comprises a metallic member 11 and a non-metallic member 12, the latter being preferably formed of celluloid, and it may here be noted that the term "celluloid" is used in a broad sense to comprehend various non-metallic substances of similar nature. It may also be noted that the term "eyeglasses" is used broadly to include any devices for holding lenses in front of the eye.

The members 11 are of relatively flat metal and extend into the rims from the rear portion, that is, the side toward the eye with the glasses in use. It may be noted at this point that by the term "inner" is meant a direction toward the center of the lens and that the term "outer" has of course an opposite significance, namely, a general radial direction away from the center of the lens. Each of these members 11 is secured to a metallic bridge member 13 and at the opposite sides of the respective lenses, is secured at its ends to the end members 14 and 15 between which the temple bars 16 are pivoted in the usual way. The end members 14 and 15 are detachably held one to another as by means of the screws 17, thus permitting the lenses to be removed by releasing these screws and permitting the adjacent ends of the rim to separate. It is thus seen that there is formed a complete metal frame irrespective of the non-metallic material hereinafter described.

Positioned about each of the metal members 11 is a non-metallic rim member 12 preferably formed of celluloid which may be so constituted as to imitate tortoise shell, if desired. Each of these members 12 substantially embraces its metal member 11 on the forward, outer and inner sides, thus concealing the latter from view in the ordinary use of the glasses. It is to be noted, moreover, that the surface of the metal rim member is preferably polished in order to reflect light passing through the translucent celluloid and thus enhance the appearance of the glasses. The celluloid members, moreover, are interlocked with the strips 11 by means of slight spurs or other surface irregularities 18, formed on the sides of the strip, which thus aid in holding the parts securely in assembled relation.

The above construction is preferably made by the following process:—The metal members 11 are suitably formed with the spurs 18 and with their surfaces polished. Thereupon the celluloid members 11 are taken when in soft condition as when newly formed or heated, and the metal members are pressed thereinto edgewise from the rear. In this manner, each complete rim is conveniently and quickly assembled and thereafter the celluloid is permitted to harden in the usual manner. By this method, the metal strip is readily made to enter the celluloid member in its final position and relation thereto simultaneously throughout the length of each rim and thus the results are rendered uniform and secure as well as being quickly achieved.

It is to be especially noted that with the parts arranged as above described, any shrinkage of the celluloid member does not disturb its relation with the metal member but carries the metal with it if such shrinkage occur, for the two parts are so disposed as in effect to form a single member. This type of glasses, furthermore, is of attractive appearance and readily accommodates itself to the lens.

In Figure 6 of the drawing, there is shown a slightly different construction in which the metal member 20 extends outwardly from the rear portion of the non-metallic rim 21. This member also is of flattened conformation and polished surface and provided with the interlocking spurs 22.

As various possible embodiments may be made of the mechanical features of the above invention and as the process above described might be varied without departing from its essence, it is to be understood that all matter herein described or shown in the accompanying drawing is to be interpreted as illustrative and not in a limiting sense.

I claim as my invention:

1. In eyeglass construction, in combination, a non-metallic rim member and a metallic member lying longitudinally thereof and extending laterally thereinto from its side surface and embraced thereby on its inner and outer surfaces.

2. In eyeglass construction, in combination, a non-metallic rim member provided with an annular slot extending transversely thereinto from its side surface and a flattened metal strip fitted edgewise into said slot throughout its length.

3. In eyeglass construction, in combination, a non-metallic rim member provided with a groove adapted to receive the edge of the lens, and a flattened metal reinforcing strip permanently embedded in said rim member throughout its length and embraced thereby throughout its inner and outer surfaces.

4. In eyeglass construction, in combination, a pair of non-metallic rim members each provided with a groove adapted to receive its lens and a pair of metallic members embedded in the rear surfaces of said non-metallic members in contact therewith throughout their inner and outer surfaces, and a bridge connected with each of said non-metallic members substantially at their rear surfaces.

5. In eyeglass construction, in combination, a pair of non-metallic rim members, a bridge, and a pair of flattened metal strips respectively secured to said bridge and respectively extending longitudinally of said non-metallic members substantially throughout their length, each of said metal members extending edgewise into said non-metallic members from the rear portions thereof, and being embraced by said non-metallic members on their inner, forward and outer surfaces.

6. In eyeglass construction, in combination, a celluloid rim member and a metal member provided with a polished surface extended into said celluloid member throughout the length of the latter whereby it tends to reflect light from its surface through said celluloid member.

7. In eyeglass construction, in combination, a non-metallic rim member and a metallic member lying longitudinally thereof and extending laterally thereinto from its side surface and embraced thereby on its inner and outer surfaces, said metal member being provided with an irregularity in its surface interlocking with said non-metallic member.

8. In eyeglass construction, in combination, an eyeglass frame comprising a pair of metallic rim members, a bridge connecting said rim members one with another, a temple bar respectively connected with said rim members at their sides remote from said bridge, and a pair of non-metallic rim members respectively encasing said first rim members on their inner, forward and outer surfaces.

9. In eyeglass construction, in combination, an eyeglass frame comprising a pair of metallic rim members, a bridge connecting said rim members one with another, a temple bar respectively connected with said rim members at their sides remote from said bridge, and a pair of non-metallic rim members respectively encasing said first rim members on their inner, forward and outer surfaces, said metallic rim members each having one or more projecting parts with which said non-metallic members respectively interlock.

10. In eyeglass construction, in combination, a celluloid rim member and a metal member provided with a polished surface lying longitudinally of said first member and extending laterally thereinto from its side surface and embraced thereby on its inner and outer surfaces.

11. In eyeglass construction, in combination, an eyeglass frame comprising a pair of metallic rim members of flattened conformation extending edgewise front to rear, a bridge connecting said rim members one with another, and a pair of non-metallic rim members respectively embracing said metallic members on their inner, outer and forward surfaces and respectively provided with an inner groove each adapted to receive its lens therein, said metallic rim members being respectively provided with one or more projections throughout their length, with which said non-metallic members interlock.

12. In eyeglass construction, in combination, a non-metallic rim member having an annular slot extending transversely thereinto from its rear surface substantially throughout its length and provided with a groove in which the lens rests, and a metallic rim member fitted within said slot and embraced by said non-metallic member on its inner and outer surfaces, said metallic member having a maximum thickness in a radial direction greater than the width of the opening in said slot in a radial direction.

13. The art of forming an eyeglass rim member which comprises forming a flattened rim member of metal with one or more lateral projections extending from its surface and a non-metallic rounded rim member, pressing the two together with the non-metallic member in soft condition until the metal member is embedded edgewise into the rear of the non-metallic member and the non-metallic member interlocks with said projection, and permitting said non-metallic member to harden.

14. In an ophthalmic mounting, the combination of an auxiliary rim provided on its rear side with an annular slot to form a sheath for the main rim, and provided with an annular groove below the slot, a main rim in the slot, and a lens seated in the groove.

In testimony whereof, I have signed my name to this specification this 15th day of May, 1919.

STEPHEN J. CLULEE.